Nov. 27, 1962  T. TIFFIN ET AL  3,065,612
UNIVERSAL DRIVING COUPLINGS
Filed July 25, 1961  2 Sheets-Sheet 1

INVENTORS
THOMAS TIFFIN AND GEOFFREY BUCKLEY
BY
ATTORNEYS

Nov. 27, 1962 T. TIFFIN ET AL 3,065,612
UNIVERSAL DRIVING COUPLINGS
Filed July 25, 1961 2 Sheets-Sheet 2

INVENTORS
THOMAS TIFFIN AND GEOFFREY BUCKLEY
BY
ATTORNEYS

United States Patent Office 3,065,612
Patented Nov. 27, 1962

3,065,612
UNIVERSAL DRIVING COUPLINGS
Thomas Tiffin, Kersal, Salford, and Geoffrey Buckley, Shaw, near Oldham, England, assignors to Dronsfield Brothers Limited, Oldham, England, a British company
Filed July 25, 1961, Ser. No. 126,559
11 Claims. (Cl. 64—17)

The present invention relates to universal driving couplings which are sometimes referred to as universal joints and sometimes as flexible couplings.

One common form of flexible coupling comprises two forked or jawed elements whose jaws are arranged at right angles to one another and pivotally connected together by a rightangular spider. Such a flexible coupling can compensate for misalignment between two shafts in so far as the shafts may lie at an angle to one another but if it is desired to compensate also for different eccentricities between the shafts two such flexible couplings are used with a slidable coupling such as a splined joint therebetween. The two couplings and the splined joint therebetween occupy a considerable axial length and the object of the present invention is to provide a universal joint or coupling which although of relatively short axial length is nevertheless capable of compensating for both forms of misalignment, namely angular and eccentric.

According to the present invention a universal coupling comprises two rotatable coupling members one of which may be the driving member and the other the driven member, a rightangular spider located between said coupling members and having two pairs of aligned arms, and connections between one pair of aligned arms and one of said coupling members and between the other pair of aligned arms and the other of said coupling members, each of said connections including a rolling pivotal bearing permitting angular displacement and a rolling sliding bearing permitting linear displacement of each pair of aligned arms in the direction of its own axis relatively to the coupling member to which it is connected.

Thus each pair of aligned arms of the spider is connected to its coupling member by a set of pivotal bearings permitting angular displacement of the aligned arms and a set of sliding bearings permitting linear displacement of the aligned arms relatively to its coupling member, said bearings being ball and/or roller bearings.

A further feature of the invention resides in the arrangement of said sets of bearings such that each of the bearings of one set lies within the axial extent of a bearing of the other set taken in the direction of the axis of rotation of the coupling. Preferably the sets of bearings of each pair of aligned arms are coaxial with one another taken in the direction of the pivotal axis of the aligned arms.

According to a still further feature of the invention each of the bearings of one set lies within the radial extent of a bearing of the other set taken in the radial direction of the coupling; in other words, the sliding and pivotal bearings are arranged at approximately the same radius from the axis of the coupling.

In a preferred form of construction the bearings of one set lie within the axial extent of the bearings of the other set taken in the axial direction of the coupling and are coaxial therewith taken in the direction of the pivotal axis of the aligned arms and the midlength of each bearing of one set is coincident with or near to the midlength of the related bearing of the other set so that the axial length of one taken in the direction of the pivotal axis of the aligned arms lies within the axial length of the other.

In the preferred form of construction the axes of the four arms of the spider are coplanar.

In a preferred form of construction guides are mounted on each coupling member to receive slides which are provided with ball and/or roller bearings in which the aligned arms of the spider can pivot. If roller bearings are provided between the slides and the guides, as is preferable, then the rollers of the roller bearings should be directed at right angles to the axis of the aligned arms of the spider journalled therein.

To centralize the spider to facilitate assembly of the coupling between two shafts or for example between the headstock of a grinding machine and work to be ground, abutment screws may be threadedly engaged in abutment nuts fixed to the outer end of each guide, each abutment nut being co-axial with the spider arm journalled in its guide and capable of applying end thrust thereto. The axes of the abutment screws and of the spider arms are preferably arranged in a common plane and the screws drivably interconnected by a set of four intermeshing bevel wheels arranged at the centre of the spider and connected to the abutment screws by spindles extending through central passages in the spider arms.

To further facilitate the assembly of the universal coupling between two shafts the rotatable coupling members of the coupling and the spider may be held in an approximately parallel relationship by means of setting bolts at opposite sides of each coupling member adapted to engage the guides at the opposite ends of the other coupling member.

The present invention is especially useful for the driving of rolls in roll grinding machines. In the driving for example of rolls of paper-making machines it is at present customary to use a so-called wobbler drive between the headstock of the grinding machine and the roll to compensate for any slight lack of alignment of the roll and the headstock of the grinding machine. In the grinding of rolls for paper-making machines it is desirable to achieve a fine surface finish, but the wobbler drive introduces a slight degree of vibration which tends to impair the surface finish.

The invention is further described by way of example with reference to the accompanying drawings in which.

Figure 1:
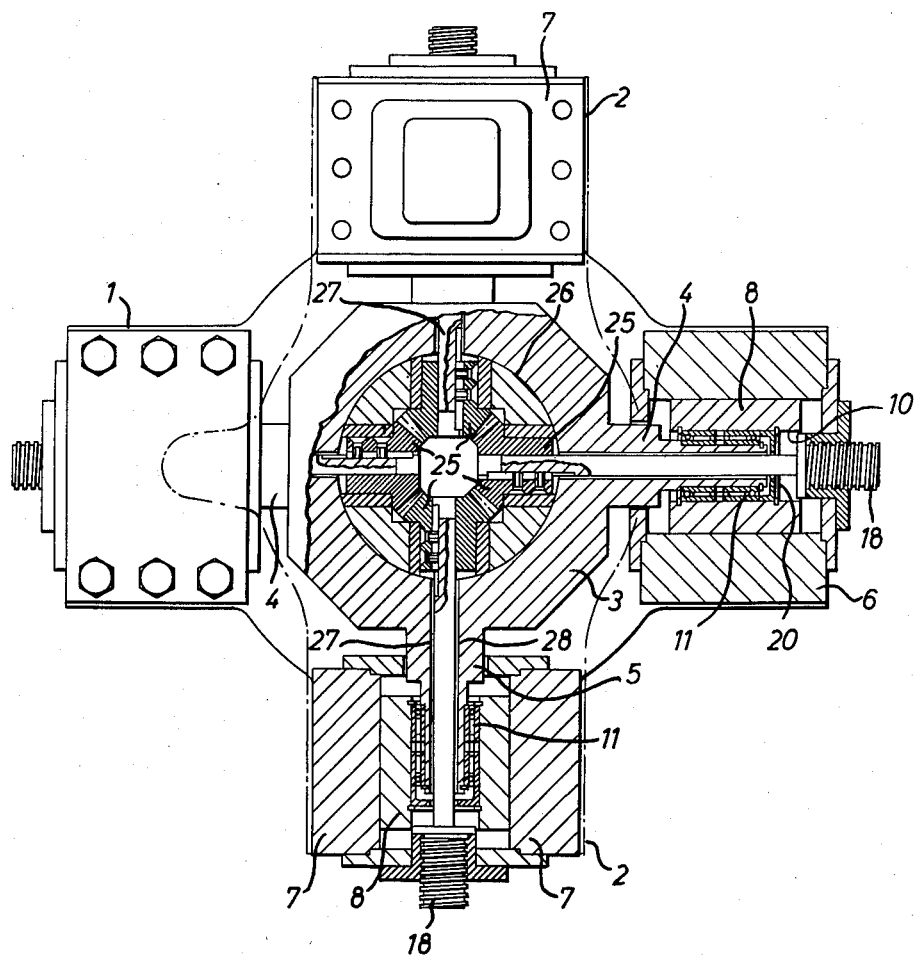
FIG. 1 is a part sectional end view.
Figure 2:
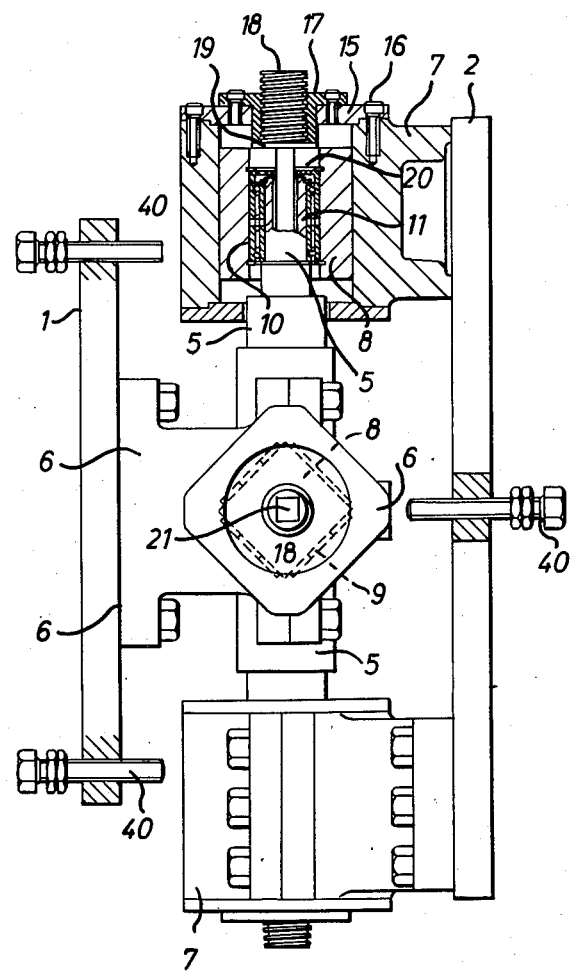
FIG. 2 is a part sectional side view.
Figure 3:
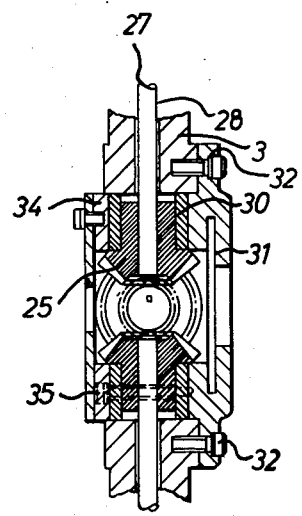
FIG. 3 is a sectional side view of a detail.

The coupling illustrated in the drawings comprises two rotatable coupling members 1, 2, of which coupling member 1 occupies a horizontal position and coupling member 2 a vertical position. A spider boss 3 has two aligned spider arms 4 extending radially outwardly therefrom and two other aligned spider arms 5 extending radially outwardly therefrom, the arms 4 being at rightangles to the arms 5 and the axes of all four arms being coplanar.

Guides 6 are mounted at opposite ends of the coupling member 1 and two similar guides 7 are mounted at opposite ends of the coupling 2. Each guide 6 or 7 receives a slide block 8. The slide blocks are of rectangular cross section and flat-faced and roller bearings 9 are provided between each of the four flat faces of each slide block 8 and the corresponding faces of the guide 6 or 7. The roller bearings 9 between each flat face of slide lock 8 and the corresponding face of the guide 6 or 7 are received in and retained by a shallow rectangular recess on the corresponding face of the guide 6 or 7. Each slide block 8 has a bearing opening 10 therein in which it pivotally supports one of the spider arms 4 or 5 by means of a ball and/or roller bearing 11. The rollers of each of the bearings 9 are directed at right angles to the axis of the bearing 11.

The bearings 9 provide for smooth linear movement and the bearings 11 provide for smooth pivotal movement of the spider arms relatively to the coupling 1 or 2 to which they are respectively pivotally connected, and thus it is possible for one coupling member to drive the other substantially without vibration notwithstanding a moderate degree of angular misalignment and/or eccentricity between the coupling members. Moreover the coupling is capable of sustaining axial thrust and is thus capable of assisting in the axial location of work to be ground in a grinding machine.

A cover plate 15 is secured by bolts 16 to the outer end of each guide 7 and to each cover plate 15 is secured a nut 17 coaxial with the bearing 11 and the spider arm therein. An abutment screw 18 with a thrust flange 19 at its inner end is threaded into the nut 17. The thrust flange 19 can come into axial engagement with the end 20 of bearing 11 (FIG. 1). Bearing 11 is capable of transmitting endwise thrust to its spider arm 4 or 5 in a direction towards the inner end of the spider arm. Thus rotation of the screw 18 in the direction which moves it inwardly relatively to its nut 17 brings the thrust flange 19 into engagement with the end 20 of bearing 11 to exert endwise inward thrust on the spider arm 4 or 5. One or more of the bolts 18 is formed with a flat sided recess 21 in its outer end to receive a key by means of which it can be rotated.

By suitable adjustment of the screws 18 the spider can be brought and locked in a central position to facilitate the set-up of the universal coupling between two members to be driven one from another, for example between the headstock of a grinding machine and a roll to be ground. To facilitate this operation each screw 18 is formed integral with a spindle 27. Each spindle 27 engages in and is angularly fixed relatively to one of a set of intermeshing bevel gears 25 housed in a cylindrical chamber 26 at the centre of the spider boss 3. Each spindle 27 passes through a central bore 28 extending longitudinally through its spider arm 4 or 5. Thus adjustment of any one of the screws 18 will, through its spindle 27, cause rotation of all of the gears 25 to result in corresponding adjustment of the other three screws 18.

The bevel gears 25 are journalled in bearings 30 which are held in position in the chamber 26 of the spider boss 3 between a cover plate 31 secured by bolts 32 to the spider boss and a plate 34 is secured by bolts 35 to the cover plate 31.

To further facilitate the setting up of the coupling of the present invention between say the headstock of a grinding machine and a roll to be ground, the rotatable coupling members 1, 2, and the spider 3, 4, 5 can be brought into approximately parallel disposition by means of setting bolts 40 at opposite sides of each coupling member 1. The setting bolts 40 are arranged so as to enable them to be screwed into engagement with the guides 7 which are mounted at opposite ends of the other coupling member.

We claim:
1. A universal coupling comprising two rotatable coupling members, a rightangular spider located between said coupling members and having two pairs of aligned arms, and connections between one pair of aligned arms and one of said coupling members and between the other pair of aligned arms and the other of said coupling members, each of said connections including a rolling pivotal bearing permitting angular displacement and a rolling sliding bearing permitting linear displacement of each pair of aligned arms in the direction of its own axis relatively to the coupling member to which it is connected.

2. A universal coupling according to claim 1 in which the axes of the spider arms are coplanar.

3. A universal coupling according to claim 1 in which one bearing of each connection lies within the axial extent of the other taken in the direction of the axis of rotation of the coupling.

4. A universal coupling according to claim 1 in which said pivotal and sliding bearings of each connection are coaxial with one another taken in the direction of the pivotal axis of the connection.

5. A universal coupling according to claim 1 in which one bearing of each connection lies within the radial extent of the other taken in the radial direction of the coupling.

6. A universal coupling according to claim 5 in which the sliding and pivotal bearings are arranged at approximately the same radius from the axis of rotation of the coupling.

7. A universal coupling according to claim 1 comprising guides on each coupling member, a slide in each of said guides, rolling bearings between said slides and guides and a pivotal rolling bearing in each slide.

8. A universal coupling according to claim 7 comprising an abutment nut secured to the outer end of each guide substantially coaxial with the axis of the pivotal bearing and an abutment screw threadedly engaging in said nut adapted to apply axial thrust to the pivotal bearing to facilitate centralization of the spider in the coupling.

9. A universal coupling according to claim 7 comprising four intermeshing bevel wheels arranged at the centre of the spider and spindles extending through passages in the spider arms connecting each of the abutment screws with one of said bevel wheels.

10. A universal coupling according to claim 7 comprising threaded setting bolts engaging in threaded holes in opposite sides of each coupling member to engage the guides of the other coupling member.

11. A universal coupling comprising two rotatable coupling members, a rightangular spider located between said coupling members and having two pairs of aligned arms, and connections between one pair of aligned arms and one of said coupling members and between the other pair of aligned arms and the other of said coupling members, the connections between each pair of aligned arms and its coupling member comprising a set of rolling pivotal bearings permitting angular displacement of the aligned arms and a set of rolling sliding bearings permitting linear displacement of the pair of aligned arms in the direction of its own axis relatively to its coupling member, the bearings of one set lying within the axial extent of the bearings of the other set taken in the axial direction of the coupling and the bearings of one set lying within the radial extent of the bearings of the other set taken in the radial direction of the coupling.

References Cited in the file of this patent

UNITED STATES PATENTS

| 1,943,814 | Cutting | Jan. 16, 1934 |
| 2,554,739 | Hughes | May 29, 1951 |

FOREIGN PATENTS

| 352,079 | Germany | Apr. 24, 1922 |
| 219,828 | Great Britain | Aug. 7, 1924 |
| 1,218,833 | France | Dec. 21, 1959 |